US010443584B2

(12) United States Patent
Maruoka et al.

(10) Patent No.: US 10,443,584 B2
(45) Date of Patent: Oct. 15, 2019

(54) FLUID PRESSURE PUMP AND FLUID PRESSURE SYSTEM

(71) Applicant: NABTESCO CORPORATION, Tokyo (JP)

(72) Inventors: Masahiko Maruoka, Gifu-ken (JP); Atsushi Fukui, Gifu-ken (JP)

(73) Assignee: NABTESCO CORPORATION, Tokyo (JP)

( * ) Notice: Subject to any disclaimer, the term of this patent is extended or adjusted under 35 U.S.C. 154(b) by 72 days.

(21) Appl. No.: 15/371,938

(22) Filed: Dec. 7, 2016

(65) Prior Publication Data

US 2017/0175721 A1 Jun. 22, 2017

(30) Foreign Application Priority Data

Dec. 17, 2015 (JP) ................................ 2015-246552

(51) Int. Cl.
*F04B 1/12* (2006.01)
*F04B 1/20* (2006.01)
(Continued)

(52) U.S. Cl.
CPC ............ *F04B 1/2007* (2013.01); *F04B 1/124* (2013.01); *F04B 1/2028* (2013.01); *F04B 1/2035* (2013.01); *F04B 1/2078* (2013.01); *F04B 17/03* (2013.01); *F04B 49/20* (2013.01); *F15B 11/08* (2013.01); *F04B 2203/021* (2013.01); *F15B 2211/20515* (2013.01)

(58) Field of Classification Search
CPC ............................. F04B 1/2007; F01B 3/0041
See application file for complete search history.

(56) References Cited

U.S. PATENT DOCUMENTS 1,817,080 A 8/1931 Howard
3,407,744 A * 10/1968 Slimm ................. F01B 3/0041
91/499

(Continued)

FOREIGN PATENT DOCUMENTS

DE 941343 4/1956
DE 1950498 U 11/1966

(Continued)

OTHER PUBLICATIONS

Office Action issued in German Patent Application No. 10 2016 224 219.9 dated Oct. 17, 2018 with English translation.

(Continued)

*Primary Examiner* — Thomas E Lazo
(74) *Attorney, Agent, or Firm* — Pillsbury Winthrop Shaw Pittman, LLP

(57) ABSTRACT

A fluid pressure pump and a fluid pressure system in which leakage of fluid and ablation of a cylinder block and a port plate can be prevented by pressing the cylinder block to the port plate with an appropriate pressing force. A hydraulic pump includes a cylinder block that has a cylinder chamber that may be in communication with an oil passage of a port plate and in which a piston is housed; and a cylinder block pressing means imparting, to the cylinder block, a pressing force that presses the cylinder block to the port plate. The cylinder block pressing mechanism has a changing means that changes the force that presses the cylinder block to the port plate.

11 Claims, 7 Drawing Sheets

(51) Int. Cl.

| | |
|---|---|
| ***F04B 17/03*** | (2006.01) |
| ***F15B 11/08*** | (2006.01) |
| ***F04B 49/20*** | (2006.01) |

(56) References Cited

U.S. PATENT DOCUMENTS

| | | | | |
|---|---|---|---|---|
| 3,777,623 | A * | 12/1973 | Bosch | F04B 1/2007 91/487 |
| 3,802,321 | A * | 4/1974 | Bosch | F01B 3/0041 91/485 |
| 3,906,841 | A | 9/1975 | Heyl | |
| 4,602,554 | A | 7/1986 | Wagenseil et al. | |
| 6,244,160 | B1 * | 6/2001 | Kunze | F01B 3/0041 417/269 |
| 7,232,293 | B2 * | 6/2007 | Sasayama | F04B 27/0843 417/222.1 |
| 2003/0180157 | A1 * | 9/2003 | Rush | B60K 6/12 417/269 |
| 2013/0224044 | A1 * | 8/2013 | Maruoka | F04B 1/20 417/269 |

FOREIGN PATENT DOCUMENTS

| | | | |
|---|---|---|---|
| DE | 2134026 | A1 | 1/1973 |
| DE | 2238582 | A1 | 2/1974 |
| DE | 3413059 | C1 | 7/1985 |
| JP | 48-017105 | A | 3/1973 |
| JP | 4-241777 | A | 8/1992 |
| JP | 2013-177859 | A | 9/2013 |

OTHER PUBLICATIONS

Notice of Reasons for Refusal Japanese Patent Application No. 2015-246552 dated Aug. 27, 2019 with English translation.

* cited by examiner

FLUID PRESSURE PUMP AND FLUID PRESSURE SYSTEM

CROSS-REFERENCE TO RELATED APPLICATIONS

This application is based on and claims the benefit of priority from Japanese Patent Application Serial No. 2015-246552 (filed on Dec. 17, 2015), the contents of which are hereby incorporated by reference in their entirety.

TECHNICAL FIELD

The present invention relates to a fluid pressure pump and fluid pressure system.

BACKGROUND

As a hydraulic pump which is one example of the fluid pressure pump, a swash-plate type hydraulic pump has been known. The swash-plate type hydraulic pump includes a swash plate disposed at an oblique angle with respect to a shaft serving as a rotational shaft; a plurality of pistons that rotate about the shaft as they are in contact with the swash plate; and a cylinder block that houses the plurality of pistons and forms a cylinder chamber together with the plurality of pistons. The hydraulic pump may include a port plate that has an oil passage configured to be connected with an oil passage situated external to the hydraulic pump. The port plate is in contact with the cylinder block and may communicate a port(s) and the cylinder chamber.

In this type hydraulic pump, the shaft and the cylinder block are rotated together by an electric motor. As they rotate, the pistons slide on the swash plate in the rotational direction of the cylinder block and reciprocate in the axial direction and thus pumping. In this manner, inlet of the hydraulic fluid into the cylinder chamber and exhaust of the hydraulic fluid from the cylinder chamber are performed.

If the oil leaks between the cylinder block and the port plate, the pump efficiency of the hydraulic pump is decreased. Furthermore, if a plurality of pistons move away from the swash plate, it would take a long time for the plurality of pistons touch the swash plate again by the rotation of the cylinder block, which also decrease the pump efficiency.

To address this problem, Japanese Patent Application Publication 2013-177859 (hereunder referred to as "'859 Publication") discloses a swash-plate type hydraulic pump that includes a pressing means for pressing the cylinder block to the port plate and a plurality of pistons to the swash plate. The pressing means includes a spherical movable member, a coupling ring through which the plurality of pistons are inserted, and a coil spring disposed between the movable member and the cylinder block. With the pressing means, the coil spring presses the movable member and the spherical surface of the movable member curved-contacts the coupling ring, which allows heads of the plurality of pitons to uniformly contact the swash plate as smoothly following the angle change of the swash plate. Moreover, the pressing means presses the cylinder block to the port plate. Therefore it is possible to prevent the oil from leaking between the cylinder block and the port plate.

In this hydraulic pump, the leakage of the oil between the cylinder block and the port plate (also referred to as a "valve plate") should be prevented during two operational states: one is a start action state and the other is rotation state. During the rotation state of the hydraulic pump, the plurality of pistons reciprocate and the hydraulic pressure in the cylinder chamber is increased so that the hydraulic pressure in the cylinder chamber pushes the cylinder block toward the port plate. Consequently the coil spring, which is the pressing member, does not have to push the cylinder block toward the port plate and it only has to do is to maintain the state where the plurality of pistons are pressed to the swash plate. Therefore the coil spring does not have to exert a large spring force. Whereas during the start action state of the hydraulic pump, the hydraulic pressure in the cylinder chamber is low so that the hydraulic pressure in the cylinder chamber does not push the cylinder block toward the port plate. Accordingly the coil spring, which is the pressing member, has to push the cylinder block toward the port plate and has to maintain the state where the plurality of pistons are pressed to the swash plate. Therefore the coil spring has to exert a large spring force.

As described above, a different magnitude of spring force may be required during the different operational states such as the start action state and the rotation state of the hydraulic pump. More specifically, if a small spring force is applied by the coil spring during the start action state of the hydraulic pump, the cylinder block is not pushed toward the port plate with an appropriate force. In this case, the hydraulic fluid may leak between the cylinder block and the port plate. Whereas if a large spring force is applied by the coil spring during the rotation state of the hydraulic pump, the sum of the hydraulic pressure in the cylinder chamber and the spring force is applied to the cylinder block and consequently an excessive pressing force is applied to the cylinder block that pushes the cylinder block toward the port plate. This may cause the cylinder block to contact the port plate directly while the cylinder block rotates relative to the port plate, which may abrade the cylinder block and the port plate. In the hydraulic pump disclosed in the '859 Publication, a coil spring that applies a spring force required at the time of the start action of the hydraulic pump is used so that the above-mentioned problem may occur during the rotation of the hydraulic pump, which needs to be addressed. This problem is not limited to the hydraulic pressure but also applies to a fluid pressure for water and an air pressure for air. In other words, this problem relates to fluid used in the pump.

SUMMARY

One object of the invention is to provide a fluid pressure pump and a fluid pressure system in which leakage of fluid and ablation of a cylinder block and a port plate can be prevented by pressing the cylinder block to the port plate with an appropriate pressing force.

(1) A fluid pressure pump according to one aspect of the invention includes a port plate in which a fluid passage is formed; a cylinder block including a cylinder chamber that may be in communication with the fluid passage in the port plate and in which a piston is housed; and a pressing means applying, to the cylinder block, a pressing force that presses the cylinder block to the port plate. The pressing means includes a changing means that changes the pressing force.

In this way, because the changing means changes the pressing force that presses the cylinder block to the port plate, it is possible to reduce the pressing force applied by the pressing means to press the cylinder block to the port plate or cause the pressing means to stop pressing the cylinder block to the port plate when the pressing means does not have to press the cylinder block to the port plate such as when the cylinder block is pressed to the port plate by a fluid pressure in the cylinder chamber. This also applies to the case where the port plate is pressed to the cylinder block by a fluid pressure in the cylinder chamber.

(2) The above-described fluid pressure pump may further include a swash plate specifying movement of the piston in a rotational axis direction of the cylinder block. The pressing means may further include a piston pressing means that presses the piston to the swash plate and a cylinder block pressing means that presses the cylinder block to the port plate, the cylinder block pressing means is disposed at a distance from the rotational axis, the distance being larger than a distance between the piston pressing means and the rotational axis, and the changing means is provided in the cylinder block pressing means.

In this way, it is relatively easier to dispose the changing means compared to cases where the changing means is disposed at the same position as the piston pressing means or an inner position when viewed from the center of the cylinder block.

(3) In the above-described fluid pressure pump, the cylinder block pressing means is operated by a fluid pressure, and the changing means changes the pressing force that presses the cylinder block to the port plate based on the fluid pressure supplied to the cylinder block pressing means.

In this way, since the cylinder block pressing means can be operated by supplying the fluid pressure of the fluid pressure pump to the cylinder block pressing means, it is not necessary to provide a mechanism exclusively used to operate the cylinder block pressing means. Therefore it is possible to simplify the configuration of the changing means.

(4) In the above-described fluid pressure pump, the changing means decreases the pressing force that presses the cylinder block to the port plate as the fluid pressure supplied to the cylinder block pressing means increases.

A fluid pressure supplied to the cylinder block pressing means is increased as a fluid pressure of the fluid pressure pump increases, and the increased fluid pressure in the cylinder chamber increases the force to press the cylinder block toward the port plate. When the fluid pressure in the cylinder chamber is sufficiently high, the cylinder block is pressed to the port plate by the fluid pressure of the cylinder chamber and thereby it is possible to prevent oil leakage between the cylinder block and the port plate. Under this condition, if the cylinder block pressing means presses the cylinder block to the port plate, the pressing force that presses the cylinder block to the port plate becomes excessively large and this may make the thickness of the oil film between the cylinder block and the port plate smaller than an appropriate thickness. Consequently the cylinder block may rotate relative to the port plate while the cylinder block is in direct contact with the port plate. In this way, the force to press the cylinder block to the port plate applied by the cylinder block pressing means can be decreased as the fluid pressure supplied to the cylinder block pressing increases and consequently it is possible to press the cylinder block to the port plate with an appropriate force based on the fluid pressure of the fluid pressure pump. As a result, it is possible to prevent the thickness of the oil film between the cylinder block and the port plate from being decreased from an appropriate thickness due to the cylinder block pressing means. Therefore it is possible to prevent the cylinder block from being in direct contact with the port plate while the cylinder block rotates relative to the port plate.

(5) In the above-described fluid pressure pump, the changing means causes the cylinder block pressing means to stop pressing the cylinder block to the port plate when the fluid pressure supplied to the cylinder block pressing means is equal to or above a predetermined fluid pressure value.

In this way, the cylinder block pressing means does not press the cylinder block to the port plate when an appropriate thickness of the oil film between the cylinder block and the port plate can be secured while the cylinder block is pressed to the port plate only by the fluid pressure in the cylinder chamber. Therefore it is possible to further reduce the risk of the cylinder block directly contacting the port plate.

(6) In the above-described fluid pressure pump, the changing means may press the cylinder block to the port plate with a predetermined force when the fluid pressure supplied to the cylinder block pressing means is below a predetermined fluid pressure value, and the changing means does not press the cylinder block to the port plate when the fluid pressure supplied to the cylinder block pressing means is equal to or above the predetermined fluid pressure value.

In this way, the cylinder block is pressed to the port plate with a predetermined force applied by the cylinder block pressing means so even when the fluid pressure in the cylinder chamber fluctuates due to pulsing of the fluid pressure while a fluid pressure in the fluid pressure pump is low, it is possible to press the cylinder block stable to the port plate. Therefore it is possible to prevent the fluid from leaking between the cylinder block and the port plate.

(7) In the above-described fluid pressure pump, the changing means may include a plurality of the cylinder block pressing means, and the plurality of cylinder block pressing means are arranged at a regular interval about the rotational axis.

In this way, comparing to a case where only a single cylinder block pressing means is provided, it is possible to evenly distribute, in the circumferential direction about the rotational axis, the force that presses the cylinder block to the port plate applied by the cylinder block pressing means. Consequently it is possible to prevent the cylinder block from tilting with respect to the port plate.

(8) The above-described fluid pressure pump may further include a housing configured to house the plurality of cylinder block pressing means. The changing means includes a communication passage through which a fluid pressure is supplied to the plurality of cylinder block pressing means, and the communication passage is provided in the housing.

In this way, the communication passage can supply a fluid pressure to the plurality of cylinder block pressing means so that it is possible to reduce the number of the communication passages that provide a fluid pressure to the cylinder block pressing means in the housing to the number smaller than the number of the cylinder block pressing means. Consequently it is possible to simplify the configuration of the housing.

(9) In the above-described fluid pressure pump, a rolling-element bearing may be attached to an outer periphery of the cylinder block, the cylinder block pressing means presses an outer ring of the rolling-element bearing, and the outer ring is movable in the rotational axis direction by the cylinder block pressing means.

Thereby it is possible to prevent the cylinder block from sliding on the cylinder block pressing means when the cylinder block is rotated. Consequently the cylinder block can be smoothly rotated. Moreover the rolling-element bearing is movable in the rotational axis direction due to the pressing force applied by the cylinder block pressing means. In this way, it is possible to change a pressing force that presses the cylinder block to the port plate in accordance with a pressing force applied by the cylinder block pressing means.

(10) The above-described fluid pressure pump may further include a housing configured to house the plurality of cylinder block pressing means. The housing may include a holder portion that has an internal space in which the cylinder block pressing means is disposed, and a fluid pressure supplying portion that is communicated with the internal space and configured to supply a fluid pressure to the internal space. The cylinder block pressing means includes a pressing rod configured to press the cylinder block to the port plate, and a pressing member configured to apply a pressing force to the pressing rod to press the pressing rod toward the cylinder block in the rotational axis direction. The pressing rod includes a pressure receiving portion that receives the fluid pressure in the direction where the pressing rod moves away from the cylinder block against the force applied to the pressing rod by the pressing member in the rotational axis direction.

In this way, a force that presses the cylinder block to the port plate applied by the cylinder block pressing mechanism can be easily calculated based on the area of the pressure receiving portion of the pressing rod and the pressing force exerted by the pressing member. Therefore it is possible to easily set the pressing force applied by the cylinder block pressing mechanism 80B to press the cylinder block 70 to the port plate 45.

(11) In the above-described fluid pressure pump, the piston pressing means may be disposed closer to the rotational axis relative to the position where the piston is disposed.

It is preferable that the piston be disposed at a distance from the rotational axis as much as possible in order to ensure a large displacement of the piston. The space between the rotational axis and the piston becomes a dead space. Since the piston pressing means is disposed closer to the rotational axis relative to the position where the piston is disposed, the dead space is utilized and consequently it is possible to reduce the size of the fluid pressure pump.

(12) A fluid pressure system according to another aspect of the invention includes the fluid pressure pump of any one of the above (1) to (11), a motor driving the fluid pressure pump, a control device controlling the motor, and a fluid actuator driven by a fluid pressure generated by the fluid pressure pump.

In this way, it is possible to provide the fluid pressure system in which leakage of fluid and ablation of the cylinder block and the port plate can be prevented.

According to the fluid pressure pump and the fluid pressure system of the invention, it is possible to prevent leakage of fluid and ablation of the cylinder block and the port plate since the cylinder block is pressed to the port plate with an appropriate force.

DESCRIPTION OF THE PREFERRED EMBODIMENTS

Figure 1:
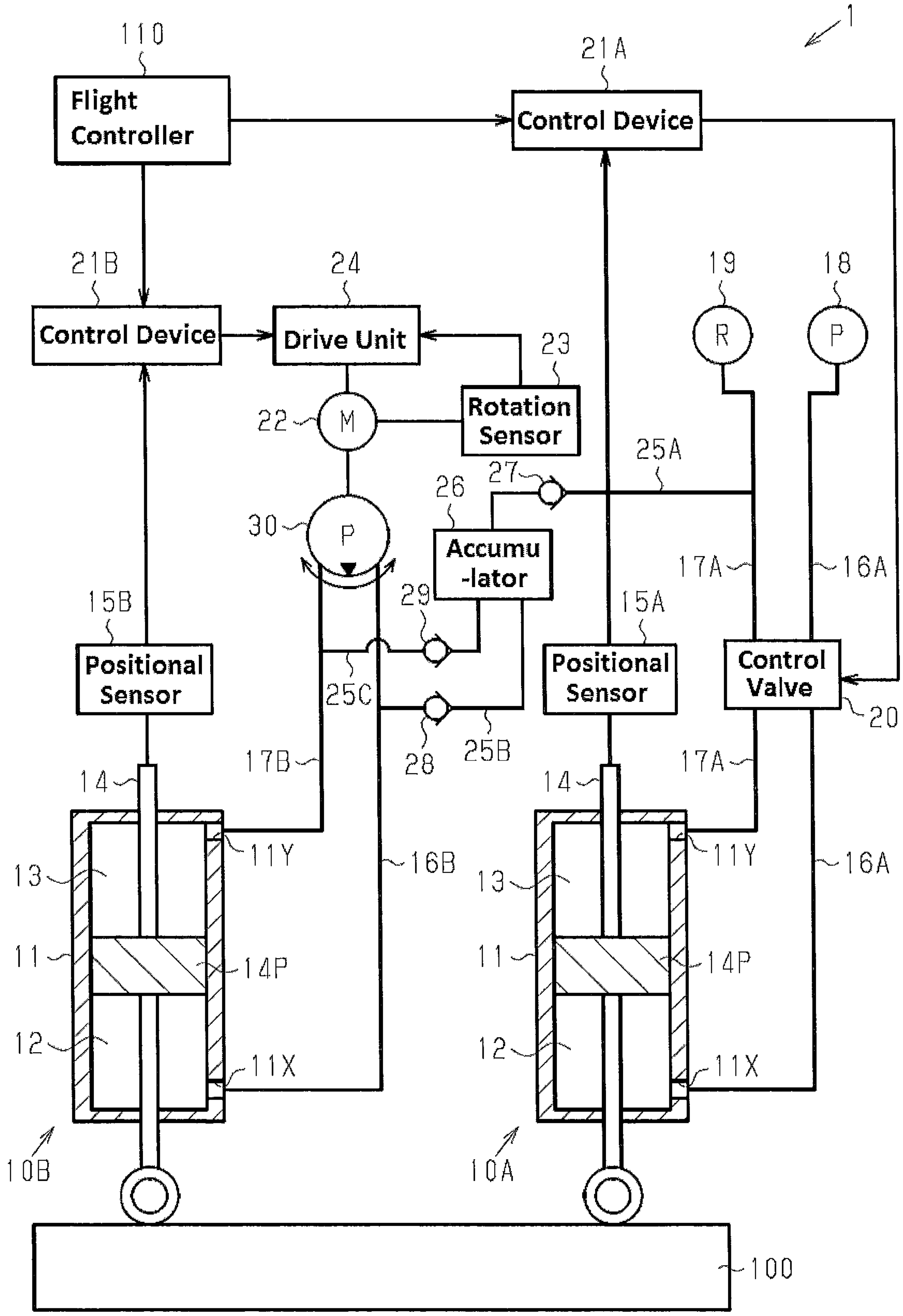
FIG. 1 schematically illustrates a configuration of a hydraulic system that includes a hydraulic pump as a fluid pressure pump according to one embodiment of the invention.

A hydraulic system 1, which is one example of a fluid pressure system, includes a hydraulic pump which is one example of a fluid pressure pump will be described with reference to FIG. 1. As another example of the fluid pressure pump, there are liquid pressure pumps such as a fuel pump and a water pump, and pneumatic pumps such as an air pump. The hydraulic system 1 may be used as a system for changing an angle of a rudder surface of a moving surface 100 provided in a fixed wing of an aircraft. The rudder surface of the moving surface 100 is provided as a flight control surface and may be used as a rudder surface of an aileron provided in a primary wing. The hydraulic system 1 may also be used as a hydraulic system (fluid pressure system) for construction machinery such as a dump truck and an excavator, commercial vehicles such as a bus and railway vehicle.

The hydraulic system 1 may include two hydraulic actuators 10A, 10B for driving the moving surface 100, and control devices 21A, 21B that control feeding and exhausting of the oil into/from the hydraulic actuators 10A, 10B respectively.

The hydraulic actuators 10A, 10B each include a housing 11 and a piston rod 14 that is inserted in the housing 11 and coupled to the moving surface 100. The inside of the housing 11 may be divided into a first hydraulic chamber 12 and a second hydraulic chamber 13 by a piston 14P of the piston rod 14. A first port 11X that is communicated with the first hydraulic chamber 12 and a second port 11Y that communicates with the second hydraulic chamber 13 may be formed in the outer wall of the housing 11. The hydraulic actuators 10A, 10B may be provided with positional sensors 15A, 15B respectively that detect the position of the corresponding piston rod 14. Note that the hydraulic actuator 10B may be a back-up hydraulic actuator in order to secure the redundancy of the hydraulic system 1.

The hydraulic actuator 10A may be coupled to a hydraulic fluid source 18 that supplies oil to the hydraulic actuator 10A through a first oil passage 16A. The hydraulic actuator 10A may also be coupled to a reservoir circuit 19 that store the oil exhausted from the hydraulic actuator 10A through a second oil passage 17A. In the first oil passage 16A and the second oil passage 17A, a control valve 20 that switches the connections between the first and second hydraulic chambers 12, 13 and the hydraulic fluid source 18 and the reservoir circuit 19 may be provided.

The control valve 20 may include a selector valve (not shown) that selects either a first communication state where the first hydraulic chamber 12 is communicated with the hydraulic fluid source 18 and the second hydraulic chamber 13 is communicated with the reservoir circuit 19 or a second communication state where the second hydraulic chamber 13 is communicated with the hydraulic fluid source 18 and the first hydraulic chamber 12 is communicated with the reservoir circuit 19. The control valve 20 switches between the first communication state and the second communication state by using, for example, an electric actuator (not shown) that operates the selector valve.

A command signal from a flight controller 110 and a detection signal from the positional sensor 15A may be supplied to the control device 21A. The control device 21A control the electric actuator based on the command signal and the detection signal to control the control valve 20.

The hydraulic actuator 10B may be coupled to a hydraulic pump 30 via the first oil passage 16B and the second oil passage 17B. The hydraulic pump 30 may supply oil to the hydraulic actuator 10B and may be driven by an electric motor 22. The electric motor 22 may include a rotation sensor 23 that detects a rotational position of a rotor (not shown) of the electric motor 22. As described above, the hydraulic actuator 10B is an example of a fluid actuator that is operated by a hydraulic pressure generated by the hydraulic pump 30.

The electric motor 22 may be driven by a drive unit 24 that is controlled by the control device 21B. A detection signal from the rotation sensor 23 may be supplied to the drive unit 24. A command signal from the flight controller 110 and a detection signal from the positional sensor 15B may be supplied to the control device 21B. The control device 21B may output, to the drive unit 24, a control signal for controlling the drive unit 24 based on the command signal and the detection signal from the positional sensor 15B. The drive unit 24 may control a rotational direction and speed of the electric motor 22 based on the control signal and the detection signal from the rotation sensor 23.

An accumulator 26 may be provided between the first and second oil passages 16B, 17B and the second oil passage 17A. An inlet oil passage 25A branched from the second oil passage 17A may be coupled to an inlet of the accumulator 26. A first exhaust oil passage 25B branched from the first oil passage 16B and a second exhaust oil passage 25C branched form the second oil passage 17B may be coupled to outlet of the accumulator 26. A first check valve 27 that allows the oil to flow from the second oil passage 17A to the accumulator 26 but shuts off the flow of the oil from the accumulator 26 to the second oil passage 17A may be provided in the inlet oil passage 25A. A second check valve 28 that allows the oil to flow from the accumulator 26 to the first oil passage 16B but shuts off the flow of the oil from the first oil passage 16B to the accumulator 26 may be provided in the first exhaust oil passage 25B. A third check valve 29 that allows the oil to flow from the accumulator 26 to the second oil passage 17B but shuts off the flow of the oil from the second oil passage 17B to the accumulator 26 may be provided in the second exhaust oil passage 25C. The accumulator 26 may supplies a hydraulic pressure to the first oil passage 16B and the second oil passage 17B so as to prevent the hydraulic pressure in the first oil passage 16B and the second oil passage 17B from decreasing due to oil leakage while the piston rod 14 of the hydraulic actuator 10B moves. In this way, it is possible to prevent cavitation from occurring in the first oil passage 16B and the second oil passage 17B.

Next, the operation of the hydraulic system 1 will now be described. When the control valve 20 is in the first communication state, oil is supplied from the hydraulic fluid source 18 to the first hydraulic chamber 12 and the oil in the second hydraulic chamber 13 is exhausted to the reservoir circuit 19. As a result, the piston rod 14 moves such that the first hydraulic chamber 12 is expanded and the second hydraulic chamber 13 is contracted and the moving surface 100 is elevated.

When the control valve 20 is in the second communication state, oil is supplied from the hydraulic fluid source 18 to the second hydraulic chamber 13 and the oil in the first hydraulic chamber 12 is exhausted to the reservoir circuit 19. As a result, the piston rod 14 moves such that the second hydraulic chamber 13 is expanded and the first hydraulic chamber 12 is contracted and consequently the moving surface 100 is descended.

If failure of the hydraulic actuator 10A occurs, the back-up hydraulic actuator 10B may be operated by the hydraulic pump 30 to elevate or descend the moving surface 100.

For example, when the electric motor 22 rotates forward, the oil in the second oil passage 17B is supplied to the hydraulic pump 30 and the hydraulic pump 30 supplies the oil to the first oil passage 16B. As a result, the piston rod 14 moves such that the second hydraulic chamber 13 is contracted and the first hydraulic chamber 12 is expanded and consequently the moving surface 100 is elevated.

Whereas when the electric motor 22 rotates in a reverse direction, the oil in the first oil passage 16B is supplied to the hydraulic pump 30 and the hydraulic pump 30 supplies the oil to the second oil passage 17B. As a result, the piston rod 14 moves such that the second hydraulic chamber 13 is expanded and the first hydraulic chamber 12 is contracted and therefore the moving surface 100 is descended.

Figure 2:
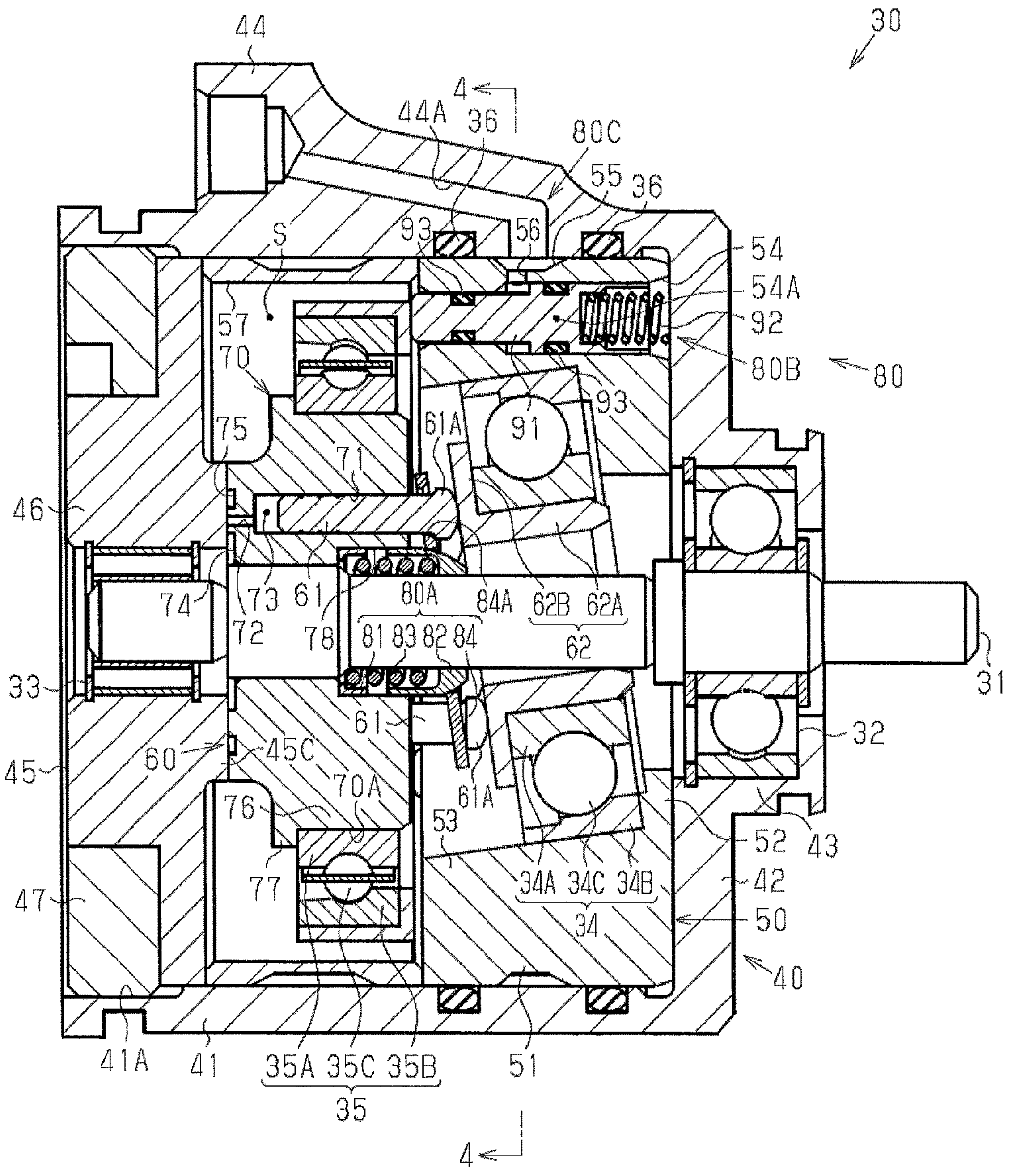
FIG. 2 is a longitudinal sectional view of the hydraulic pump of FIG. 1.

The structure of the hydraulic pump 30 will be now described in detail with reference to FIGS. 2 to 5. Referring to FIG. 2, the hydraulic pump 30 may include a housing 40, and a shaft 31 that is inserted in the housing 40 and serves as a rotational shaft coupled indirectly to the electric motor 22 (see FIG. 1). The hydraulic pump 30 may further include a first bearing 32 and a second bearing 33 that rotatably support the shaft 31 relative to the housing 40. The first bearing 32 may be a ball bearing and the second bearing 33 may be a roller bearing. Alternatively the first bearing 32 may be other rolling-element bearing such as a roller bearing. In the same manner, the second bearing 33 may be other rolling-element bearing such as a ball bearing.

The shaft 31 may be coupled to the electric motor 22 via a reducer mechanism (not shown) that is formed of, for example, a plurality of gears. A torque output by the electric motor 22 is transmitted to the shaft 31 through the reducer mechanism. The shaft 31 may be coupled to the electric motor 22 via a pulley that serves as the reducer or may be coupled directly to the electric motor 22.

The housing 40 have a bottomed cylindrical shape which has an opening on one side in the rotational axis direction (hereunder simply referred to as an "axial direction") of the shaft 31. A port plate 45 may be disposed at the opening of the housing 40. The port plate 45 covers the opening of the housing 40. A pump mechanism 60, a third bearing 34 and a fourth bearing 35 may be housed within an internal space S defined by the housing 40 and the port plate 45. The third bearing 34 and the fourth bearing 35 may be ball bearings. Alternatively the third bearing 34 and the fourth bearing 35 may be other rolling-element bearings such as roller bearings. The internal space S may be filled with oil.

The housing 40 may include a cylindrical portion 41 that extends in the axial direction and a side wall 42 that closes one end of the cylindrical portion 41 in the axial direction. A bearing attachment portion 43 to which the first bearing 32 is attached may be formed at the center of the side wall 42. The port plate 45 may be fitted in the opening 41A of the cylindrical portion 41 and a fixing member 47 may be screwed therein. The fixing member 47 may be, for example, a locknut.

The housing 40 may include a first block 50 and a second block 57. The first block 50 and the second block 57 may be attached to the housing 40. The first block 50 and the second block 57 may be housed within the internal space S of the housing 40. One or both of the first block 50 and the second block 57 may be integrally formed with the housing 40 in order to reduce the number of assembling steps.

Figure 4:
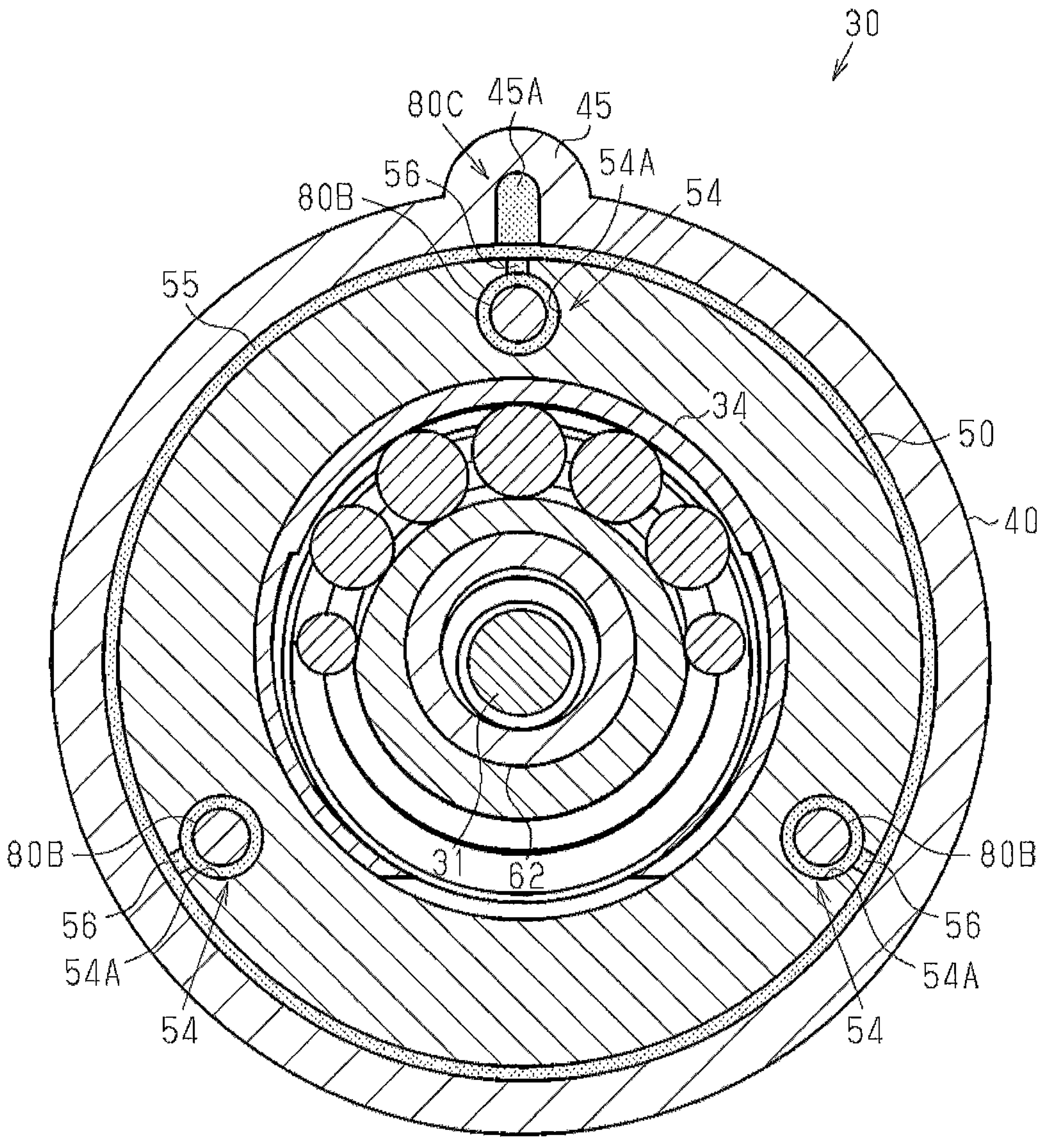
FIG. 4 is a sectional view of the hydraulic pump of FIG. 2 along the line 4-4.

The first block 50 may be fitted on the cylindrical portion 41 and may be in contact with the side wall 42 in the axial direction. The first block 50 may include a cylindrical portion 51 that extends in the axial direction, and a flange 52 that extends from the end of the cylindrical portion 51 situated closer to the side wall 42 toward the radially inner side. A bearing attachment portion 53 to which the third bearing 34 is attached may be formed on the inner circumferential portion of the cylindrical portion 51. Referring to FIG. 4, three holder portions 54 may be formed at an interval of 120° in the first block 50. The holder portions 54 may be holes that penetrate the cylindrical portion 51 of the first block 50 in the axial direction.

Referring to FIG. 2, the second block 57 may have a cylindrical shape. The second block 57 may be fitted on the cylindrical portion 41 of the housing 40 such that it is sandwiched between the first block 50 and the port plate 45 in the axial direction.

The port plate 45 may have a disk shape. A bearing attachment portion 46 to which the second bearing 33 is attached may be formed in the port plate 45. The port plate 45 may be sandwiched between the second block 57 and the fixing member 47 in the axial direction. In this manner, the port plate 45 is fixed to the housing 40.

Figure 3:
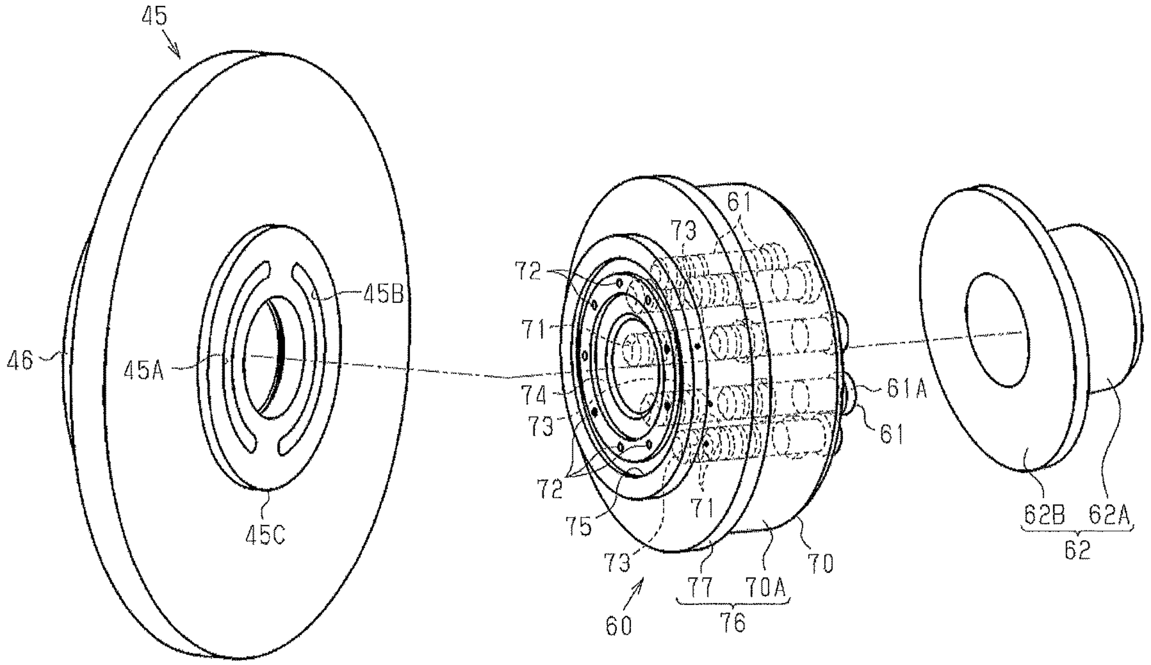
FIG. 3 is an exploded perspective view of a port plate and a pump mechanism of the hydraulic pump of FIG. 2.

Referring to FIG. 3, a cylindrical projecting portion 45C that projects in the direction opposite to the bearing attachment portion 46 in the axial direction may be formed at the center of the port plate 45. In the projecting portion 45C, a first port 45A which is an arc-shaped opening extending in the circumferential direction and a second port 45B which is an arc-shaped opening extending in the circumferential direction may be formed. The first port 45A may be communicated with the first oil passage 16B (see FIG. 1) and the second port 45B may be communicated with the second oil passage 17B (see FIG. 1). Note that any number of the ports 45A, 45B may be provided as needed. For example, more than one port 45A and more than one port 45B may be provided.

The pump mechanism 60 may include a cylinder block 70 that is spline-engaged with the shaft 31 (see FIG. 2), nine pistons 61 housed in the cylinder block 70 such that they are movable relative to the cylinder block 70 in the axial direction, and a swash plate 62 that specifies a displacements of the pistons 61 in the axial direction. Note that any number of the pistons 61 may be provided as needed. For instance, the number of the pistons 61 may be less than eight or more than nine.

The cylinder block 70 may be disposed so as to face the port plate 45 in the axial direction indicated by the dashed-dotted line and may rotate together with the shaft 31. Nine piston insertion portions 71 through which the pistons 61 are inserted may be formed in the cylinder block 70 at a regular interval in the circumferential direction. Ports 72 that open toward the port plate 45 may be formed in the piston insertion portions 71 respectively. Referring to FIG. 2, a cylinder chamber 73 is formed between the piston insertion portion 71 and the piston 61. The cylinder chamber 73 may generate a force to bias the piston 61 through inlet and exhaust of oil via the port 72. The cylinder chamber 73 may be communicated with the first oil passage 16B and the second oil passage 17B (see FIG. 1) through the first port 45A and the second port 45B respectively. In this manner, the first port 45A and the second port 45B form oil passages that connect the first oil passage 16B and the second oil passage 17B to the cylinder chamber 73. In other words, they provide oil passage of the port plate.

Referring to FIG. 3, an inner circumferential recess 74 and an outer circumferential recess 75 that form gaps with the port plate 45 in the axial direction may be formed in the cylinder block 70 at the position where faces the projecting portion 45C of the port plate 45. The inner circumferential recess 74 may be disposed on the inner side with reference to the port 72 and the outer circumferential recess 75 may be disposed on the outer side with reference to the port 72. The inner circumferential recess 74 and the outer circumferential recess 75 may be filled with oil.

A bearing attachment portion 76 to which the fourth bearing 35 (see FIG. 2) is attached may be formed on the outer circumferential portion of the cylinder block 70. The bearing attachment portion 76 may include an outer peripheral surface 70A of the cylinder block 70, and an annular flange 77 that projects from the outer peripheral surface 70A toward the outside in the radial direction.

The piston 61 may project out from the piston insertion portion 71 toward the swash plate 62. The end of the piston 61 situated closer to the swash plate 62 may have a piston head 61A that has a diameter larger than the piston 61. An end surface of the piston head 61A facing the swash plate 62 may be formed as a convex spherical surface.

The swash plate 62 may have a central axis that is angled with respect to the axial direction of the shaft 31. The swash plate 62 may include a cylindrical portion 62A that extends along the central axis and an annular flange 62B that extends from the end of the cylindrical portion 62A situated closer to the piston 61 in the direction orthogonal to the central axis. The flange 62B may be in contact with the piston head 61A of the piston 61.

Referring to FIG. 2, the swash plate 62 may be housed in the first block 50 and retained by the third bearing 34 such that it is rotatable relative to the first block 50 about the central axis. The third bearing 34 may include an inner ring 34A attached to the cylindrical portion 62A of the swash plate 62, an outer ring 34B attached to the bearing attachment portion 53 of the first block 50, and a plurality of rolling elements 34C disposed between the inner ring 34A and the outer ring 34B.

The hydraulic pump 30 may include a pressing mechanism 80, which is one example of a pressing means that is able to apply a force to the nine pistons 61 to press the nine pistons 61 to the swash plate 62 and to apply a force to the cylinder block 70 to press the cylinder block 70 to the port plate 45. The pressing mechanism 80 may include a piston pressing mechanism 80A which is one example of a piston pressing means and three cylinder block pressing mechanisms 80B which are one example of the cylinder block pressing means. The piston pressing mechanism 80A and the cylinder block pressing mechanisms 80B may be separately formed. The piston pressing mechanism 80A and the cylinder block pressing mechanisms 80B may be housed in the internal space S of the housing 40. Any number of the cylinder block pressing mechanisms 80B may be provided as needed. For example, the number of the cylinder block pressing mechanisms 80B may be one, two, four or more. One or more components forming the piston pressing mechanism 80A may be referred to as a second biasing member.

The piston pressing mechanism 80A may be provided in the pump mechanism 60 and impart a force to the nine pistons 61 to press the nine pistons 61 to the swash plate 62. A part of the piston pressing mechanism 80A may be disposed between a central concave portion 78 of the cylinder block 70 and the shaft 31. More specifically, the piston pressing mechanism 80A may be disposed on the inner side with reference to the nine pistons 61 in the radial direction of the hydraulic pump 30. In other words, the piston pressing mechanism 80A may be disposed closer to the shaft 31 compared to the nine pistons 61.

The piston pressing mechanism 80A may include a fixed member 81 fixed to the cylinder block 70, a movable member 82 movable in the axial direction relative to the cylinder block 70 and the shaft 31, and a coil spring 83 which is one example of a resilient member for pressing the nine pistons 61 to the swash plate 62, and a coupling ring 84 through which the nine pistons 61 are inserted. The movable member 82 may have a spherical surface that contacts the inner periphery of the coupling ring 84. The coil spring 83 may be sandwiched between the fixed member 81 and the movable member 82. The coupling ring 84 may curved-contact the spherical surface of the movable member 82 so that it can be inclined from the movable member 82 in the axial direction.

The piston pressing mechanism 80A may use other element than the coil spring 83 to press the pistons 61 to the swash plate 62. For instance, a first magnet attached to the cylinder block and a second magnet that faces the first magnet in the axial direction and is attached to the coupling ring 84 may be used instead of the coil spring 83. In this case, these magnets are arranged such that the surface of the first magnet facing the second magnet has the same polarity as that of the surface of the second magnet facing the first magnet. Alternatively the piston pressing mechanism 80A may be configured to omit the fixed member 81 and the coil spring 83 may directly push the cylinder block 70.

Nine insertion holes 84A through which the pistons 61 are inserted respectively may be formed in the coupling ring 84. Above the insertion holes 84A, the piston heads 61A may protrude out toward the swash plate 62. The coil spring 83 presses the movable member 82 to the swash plate 62. In this manner, the coupling ring 84 is pressed toward the swash plate 62 through the movable member 82. As the coupling ring 84 is pressed, the edge of the insertion hole 84A of the coupling ring 84 pushes the piston head 61A and consequently the piston 61 is pressed to the swash plate 62. In this way, the piston 61 remains in contact with the swash plate 62 and the piston heads 61A of the nine pistons 61 are always in contact with the swash plate 62 irrespective of the driving state of the hydraulic pump 30. As described above, in the piston pressing mechanism 80A, the force to press the nine pistons 61 to the swash plate 62 is specified based on the spring force (elastic force) of the coil spring 83.

Referring to FIG. 4, the cylinder block pressing mechanism 80B may be housed in the internal space 54A of the holder portion 54. Accordingly the cylinder block pressing mechanisms 80B may be arranged at a regular interval along the circumferential direction of the cylinder block 70. Accordingly the cylinder block pressing mechanisms 80B may be arranged at a regular interval (an equal angle) about the rotational axis of the cylinder block 70. In this way, it is possible to press the cylinder block 70 in the axial direction in a well-balanced manner. Note that the cylinder block pressing mechanisms 80B do not rotate when the cylinder block 70 (see FIG. 2) rotates. As long as the cylinder block pressing mechanisms 80B are arranged at a substantially equal interval along the circumferential direction of the cylinder block 70, actual distances or intervals between adjacent cylinder block pressing mechanisms may slightly differ from each other due to assembly error or the like.

At a part of the peripheral portion of the housing 40 in the circumferential direction, an introducing portion 44 that is communicated with the first oil passage 16B and the second oil passage 17B (see FIG. 1) and supplies oil to the cylinder block pressing mechanisms 80B may be formed. The introducing portion 44 may be formed as a portion that protrudes out from the cylindrical portion 41 of the housing 40 in the radial direction. The introducing portion 44 and the housing 40 may be formed from the single member. The introducing portion 44 may have an introducing oil passage 44A that opens toward the inner peripheral surface of the housing 40. One of the three holder portions 54 may be disposed at the same position as the introducing portion 44 in the circumferential direction. Alternatively, the introducing portion 44 may be separately formed from the housing 40. An annular seal member 36 may be provided in the housing 40 at the both ends of the axial direction of the introducing oil passage 44A. The seal member 36 may seal between the side wall 42 of the housing 40 and the first block 50. The seals 36 may be, for example, O-rings.

On the periphery of the first block 50, a communication passage 55 that is an annular groove may be formed. The communication passage 55 may be communicated with the introducing oil passage 44A. Referring to FIG. 2, the communication passage 55 may have a tapered portion where the size of the passage in the axial direction increases toward the outside in the radial direction. The size of the tapered portion may be larger than the diameter of the introducing oil passage 44A so that the flow of the hydraulic fluid supplied from the introducing oil passage 44A to the communication passage 55 will not be disturbed even if a minor assembling error occurs.

Figure 5:
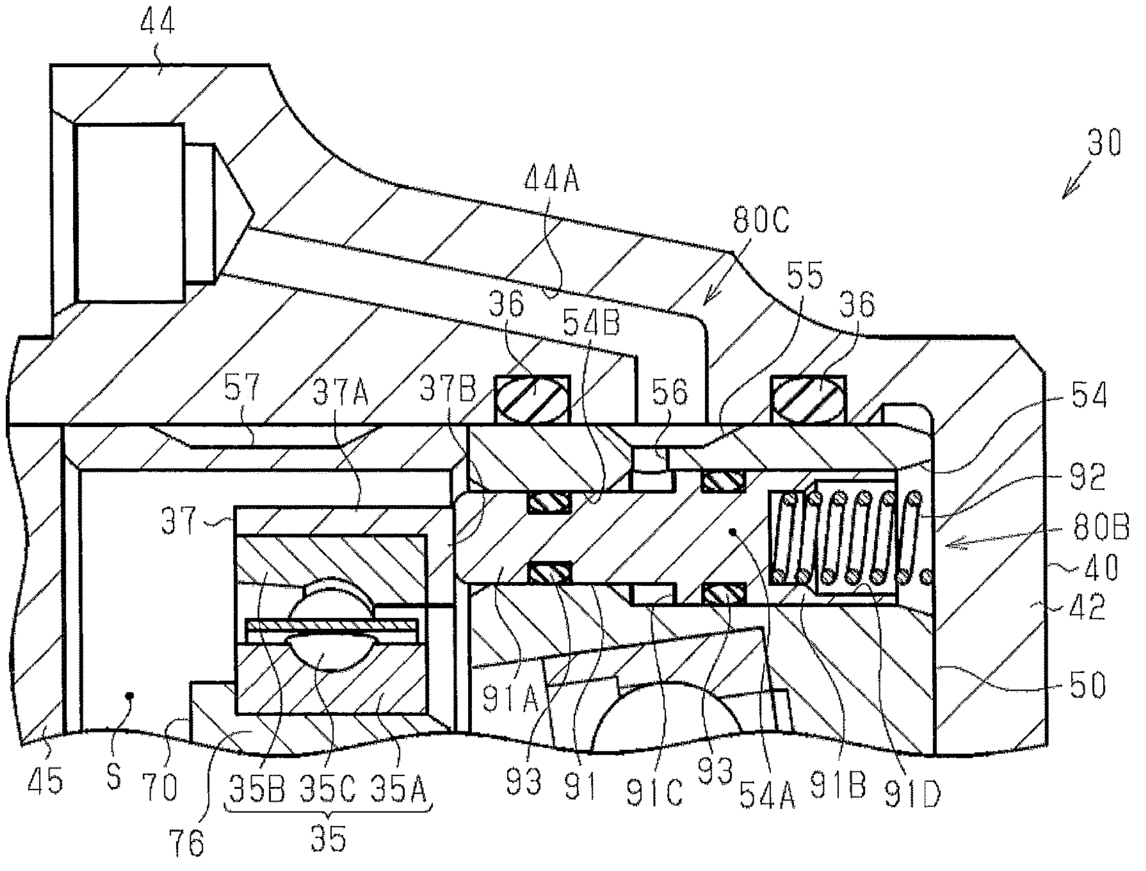
FIG. 5 is an enlarged view of a cylinder block pressing means and its peripheral region of the hydraulic pump of FIG. 2.

At a portion of the first block 50 that faces the introducing oil passage 44A, may be formed an opening 56 which is one example of a hydraulic pressure supplying portion that supplies hydraulic pressure to the internal space 54A of the holder portion 54. The opening 56 may penetrate the outer peripheral surface of the cylindrical portion 51 of the first block 50 and the internal space 54A of the holder portion 54 in the radial direction so that it couples the communication passage 55 to the holder portion 54 in the radial direction. Therefore the oil in the introducing oil passage 44A is supplied to the three cylinder block pressing mechanisms 80B through the communication passage 55 and the opening 56. Note that the introducing portion 44 may be disposed at a different position from the holder portion 54 in the circumferential direction as long as the introducing oil passage 44A is communicated with the communication passage 55. Referring to FIG. 5, the inner diameter of the opening 56 may be smaller than the smallest dimension of the communication passage 55 in the axial direction.

Referring to FIG. 5, in a portion of the holder portion 54 situated closer to the cylinder block 70 from the opening 56, provided is a smaller portion 54B where the diameter of the holder portion 54 is made smaller than that of the opening 56 and the portion of the holder portion 54 situated closer to the side wall 42 of the housing 40.

The cylinder block pressing mechanism 80B may include a pressing rod 91 that extends in the axial direction, a coil spring 92 which is one example of a pressing member that applies a force to the pressing rod 91 to allow the pressing rod 91 to press the cylinder block 70 in the axial direction, and two seal members 93. The pressing rod 91 and the coil spring 92 may be referred to as a first biasing member that biases the cylinder block 70 to the port plate 45 in a first axial direction.

The pressing rod 91 may include a small diameter portion 91A that is configured to be inserted into the smaller portion 54B of the holder portion 54, and a large diameter portion 91B that is connected with the small diameter portion 91A and has an outer diameter larger than the small diameter portion 91A. A pressure receiving portion 91C that is a difference in level between the smaller diameter portion 91A and the large diameter portion 91B may be formed at the boundary between the smaller diameter portion 91A and the large diameter portion 91B.

In the large diameter portion 91B, a spring container portion 91D that accommodates the coil spring 92 may be formed. Two seal members 93 may be provided in the smaller diameter portion 91A and the large diameter portion 91B. The seal member 93 of the two seal members 93 that is situated closer to the cylinder block 70 may seal between the small diameter portion 91A and the smaller portion 54B, and the seal member 93 situated closer to the side wall 42 of the housing 40 may seal between the large diameter portion 91B and a portion of the holder portion 54 situated closer to the side wall 42 with reference to the opening 56.

The pressure receiving portion 91C may be situated closer to the side wall 42 with reference to the opening 56 and closer to the cylinder block 70 with reference to the seal member 93 situated closer to the side wall 42. When the cylinder block pressing mechanism 80B is in a first state, the pressure receiving portion 91C is situated in the proximity of the opening 56. The pressure receiving portion 91C may have an annular plane parallel to the plane orthogonal to the axial direction. Alternatively the pressure receiving portion 91C may have a rectangular shape or an ellipsoidal annular shape instead of the annular shape. Alternatively the pressure receiving portion 91C may be formed in a three-dimensional shape that may have, for example, a step, instead of a planer shape.

The coil spring 92 may be sandwiched between the spring container portion 91D and the side wall 42 of the housing 40 in the axial direction such that the coil spring 92 is contracted. Alternative to the coil spring 92, other resilient members such as rubber, magnets attached to the pressing rod 91 and the side wall 42 respectively such that opposing faces have the same magnetic polarity in the axial direction, or other mechanism to provide a fluid such as oil or gas such as air to the holder portion 54 such that the pressing rod 91 pushes the cylinder block 70 may be used. In short, a mechanism that imparts a force to the pressing rod 91 to allow the pressing rod 91 to press the cylinder block 70 may be provided.

The fourth bearing 35 attached to the bearing attachment portion 76 of the cylinder block 70 may include an inner ring 35A that is attached to the bearing attachment portion 76, an outer ring 35B that is spaced from the inner ring 35A, and a plurality of rolling elements 35C disposed between the inner ring 35A and the outer ring 35B. An annular cover member 37 whose sectional shape in a plane along the axial direction and the radial direction is an L-shaped may be attached to the outer ring 35B. The cover member 37 may include a cylindrical portion 37A that covers the outer periphery of the outer ring 35B, and a flange 37B that covers an end surface of the outer ring 35B situated closer to the first block 50. The cylindrical portion 37A faces the second block 57 in the radial direction with a gap interposed therebetween. The forth bearing 35 is configured to have the outer ring 35B that is movable in the axial direction relative to the housing 40. The pressing rod 91 may contact the surface of the flange 37B situated closer to the first block 50. The fourth bearing 35 may be freely fit in a gap in the housing 40. The gap between the outer ring 35B of the fourth bearing 35 and the second block 57 may be smaller than illustrated. Alternatively the fourth bearing 35 may have the inner ring 35A that is formed integrally with the cylinder block 70. In other words, a part of the outer periphery of the cylinder block 70 may serve as the inner ring.

A changing means 80C that changes a force to press the cylinder block 70 to the port plate 45 may be provided in the cylinder block pressing mechanism 80B. The changing means 80C according to the embodiment is configured to reduce the force that is applied by the cylinder block pressing mechanism 80B and that presses the cylinder block 70 to the port plate 45. More specifically, the changing means 80C is configured to supply a hydraulic pressure to the cylinder block pressing mechanism 80B to impart a force to the pressing rod 91 against the spring force of the coil spring 92 in the cylinder block pressing mechanism 80B. Therefore the changing means 80C may include the introducing oil passage 44A of the housing 40, the communication passage 55 of the first block 50, the opening 56, and the pressure receiving portion 91C of the pressing rod 91. The force against the spring force may be obtained by multiplying the area of the pressure receiving portion 91C by the hydraulic pressure supplied from the introducing oil passage 44A, and the area of the pressure receiving portion 91C may be determined based on the spring force and the hydraulic pressure generated by the hydraulic pump 30.

The changing means 80C may change the pressing force that is applied by the cylinder block pressing mechanism 80B and that presses the cylinder block 70 to the port plate 45, based on the hydraulic pressure supplied to the cylinder block pressing mechanism 80B. The changing means 80C is able to switch the operational state of the cylinder block pressing mechanism 80B, more specifically, switch between a first state where the force that presses the cylinder block 70 to the port plate 45 is applied to the cylinder block 70, and a second state where the force that presses the cylinder block 70 to the port plate 45 is not applied to the cylinder block 70. The changing means 80C may switch between the first state and the second state of the cylinder block pressing mechanism 80B based on the hydraulic pressure supplied to the cylinder block pressing mechanism 80B. When the cylinder block pressing mechanism 80B is in the first state, the changing means 80C may decrease the pressing force applied by the cylinder block pressing mechanism 80B to press the cylinder block 70 to the port plate 45 as the hydraulic pressure supplied to the cylinder block pressing mechanism 80B increases. When the hydraulic pressure supplied to the cylinder block pressing mechanism 80B is further increased and reaches to or above a predetermined hydraulic pressure, the changing means 80C may decrease the pressing force that is applied by the cylinder block pressing mechanism 80B and that presses the cylinder block 70 to zero (0). In other words, when the hydraulic pressure reaches to or above a predetermined value, the cylinder block pressing mechanism 80B does not press the cylinder block 70 to the port plate 45 anymore. In this way, the cylinder block pressing mechanism 80B transitions to the second state. As described above, the changing means 80C may automatically switch between the first state and the second state of the cylinder block pressing mechanism 80B based on the hydraulic pressure of the hydraulic pump 30. The above-mentioned predetermined hydraulic pressure may be a hydraulic pressure supplied to the cylinder block pressing mechanism 80B after the hydraulic pump 30 has been activated, for instance, it has a value of the hydraulic pressure supplied to the cylinder block pressing mechanism

80B when the hydraulic pump 30 reaches to a target rotational speed after the activation.

The operation of the hydraulic pump 30 and its action will be now described with reference to FIGS. 1 to 6. The same reference numerals used for the hydraulic system 1 illustrated in FIG. 1 may be hereunder used for the corresponding components of the hydraulic system 1.

Figure 6A:
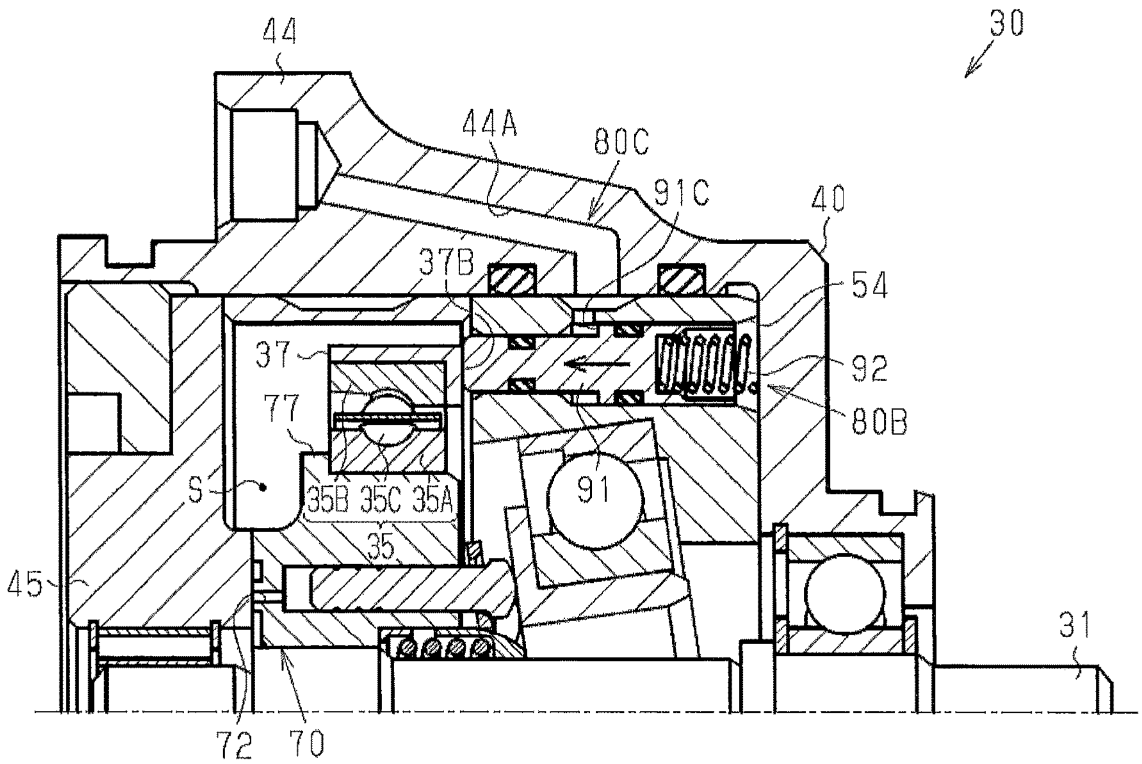
FIG. 6*a* is a half section of the hydraulic pump in which the cylinder block pressing means presses the cylinder block to the port plate.

When the electric motor 22 is stopped, a hydraulic pressure is not supplied to the cylinder block pressing mechanism 80B through the introducing oil passage 44A so that the cylinder block pressing mechanism 80B is in the first state. More specifically, in the first state, the pressing rod 91 is pressed by the coil spring 92 and the pressing rod 91 presses the cover member 37 toward the port plate 45 as shown in FIG. 6*a*. In this manner, the outer ring 35B of the fourth bearing 35 is pressed toward the port plate 45 through the cover member 37. The force applied to the outer ring 35B may be transmitted to the inner ring 35A though the rolling elements 35C. In this way, the inner ring 35A is pressed toward the port plate 45. Since the inner ring 35A is supported by the flange 77 of the cylinder block 70, the force applied to the inner ring 35A is transmitted to the outer periphery of the cylinder block 70. Therefore the cylinder block 70 is pressed to the port plate 45 by the cylinder block pressing mechanism 80B. Consequently the contact portions of the cylinder block 70 and the port plate 45 contact tightly to each other so that it is possible to prevent the oil from leaking between the port 72 of the cylinder block 70 and the port plate 45.

When the electric motor 22 rotates forward from the stopped state, the shaft 31 of the hydraulic pump 30 is rotated and consequently the cylinder block 70 rotates forward. Upon the rotation of the cylinder block, oil in the second oil passage 17B is supplied to the cylinder block 70 through the second port 45B of the port plate 45 and then oil in the cylinder block 70 is supplied to the first oil passage 16B through the first port 45A. At this point, the oil in the first oil passage 16B is supplied to the cylinder block pressing mechanism 80B through the introducing oil passage 44A.

Figure 6B:
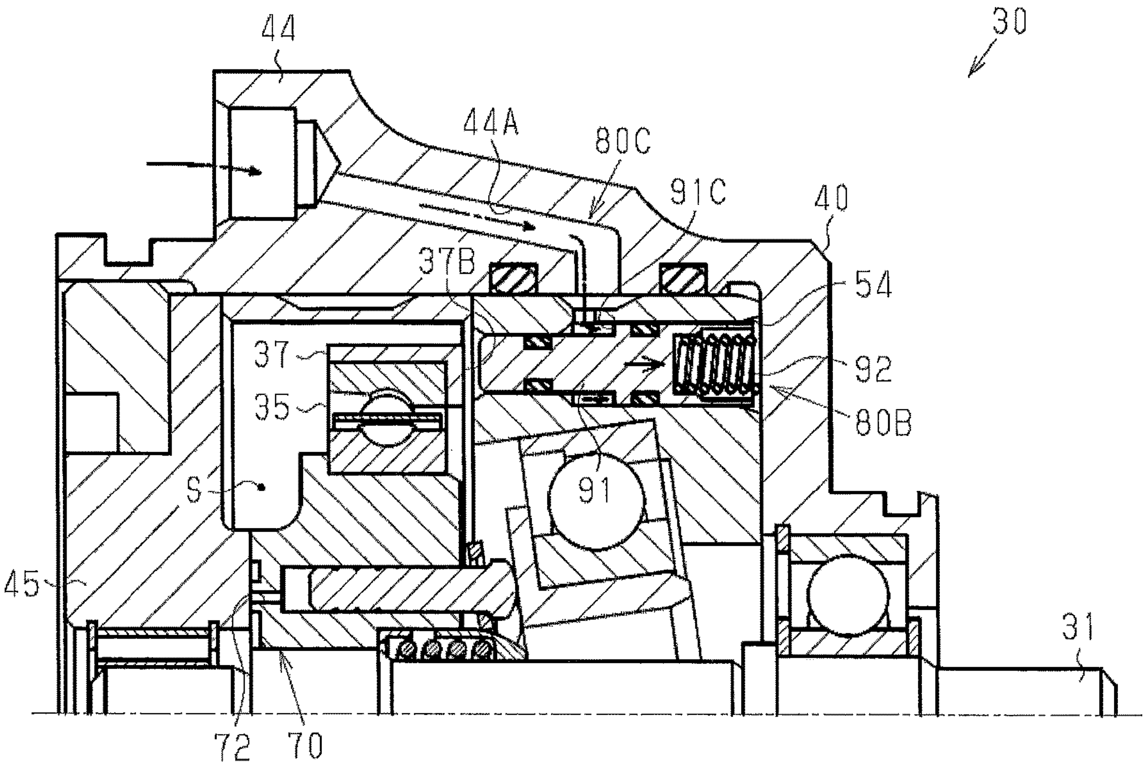
FIG. 6*b* is a half section of the hydraulic pump in which the cylinder block pressing means does not press the cylinder block to the port plate.

The pressure receiving portion 91C of the pressing rod 91 receives the hydraulic pressure supplied to the cylinder block pressing mechanism 80B through the introducing oil passage 44A. Consequently the force to move the pressing rod 91 against the spring force of the coil spring 92 in the direction where the coil spring 92 is contracted is applied to the pressing rod 91. In this way, the cylinder block pressing mechanism 80B transitions to the second state. In the second state, the pressing rod 91 is separated from the cover member 37 as shown in FIG. 6*b*.

When the electric motor 22 changes its rotation from a forward direction to a reverse direction, the electric motor 22 stops the forward rotation and then starts the reverse rotation. Accordingly the cylinder block pressing mechanism 80B is in the second state while the electric motor 22 rotates forward, the cylinder block pressing mechanism 80B is then switched to the first state while the electric motor 22 is stopped, and the cylinder block pressing mechanism 80B turns to the second state again while the electric motor 22 rotates in the reverse direction. In this way, it is possible to prevent oil leakage between the cylinder block 70 and the port plate 45 when the rotation of the electric motor 22 is changed from the forward to the reverse. When the electric motor 22 starts the reverse rotation, the oil in the second oil passage 17B is supplied to the cylinder block pressing mechanism 80B through the introducing oil passage 44A so that the state of the cylinder block pressing mechanism 80B is switched from the first state to the second state.

Meanwhile, in the hydraulic pump disclosed in the '859 Publication, a force that is applied by the pressing mechanism to press the cylinder block to the port plate always acts on the cylinder block. Therefore the cylinder block slides on the cylinder block when the cylinder block starts rotation and a sufficient oil film has not been formed yet between the cylinder block and the port plate, which may cause ablation of the cylinder block. As a result, the life of the hydraulic pump may be shortened.

Whereas in the hydraulic pump 30 according to the embodiment, the hydraulic pressure is supplied to the cylinder block pressing mechanism 80B and the cylinder block pressing mechanism 80B is switched to the second state so that the cylinder block 70 is not pressed to the port plate 45. Therefore a time period in which the cylinder block 70 slides on the port plate 45 can be made shorter compared to the hydraulic pump of the '859 Publication and it is possible to prevent the ablation of the cylinder block 70. Consequently it is possible to prevent the reduced life of the hydraulic pump 30.

Especially for a bidirectional hydraulic pump in which the cylinder block rotates in forward and reverse directions as the electric motor rotates forward and reverse, the cylinder block slides on the port plate frequently compared to a unidirectional hydraulic pump when the moving surface 100 is elevated and descended at a predetermined number of times by the hydraulic system 1. For this reason, the life of the bidirectional hydraulic pump tends to be quickly reduced.

Whereas in the hydraulic pump 30 according to the embodiment, it is possible to reduce the time period in which the cylinder block 70 slides on the port plate 45 with the cylinder block pressing mechanism 80B. Therefore even when the hydraulic pump 30 is the bidirectional type, it is possible to prevent a life of the hydraulic pump 30 from being reduced due to the ablation of the cylinder block 70.

The hydraulic pump 30 and the hydraulic system 1 have the following advantages. (1) The cylinder block pressing mechanism 80B of the hydraulic pump 30 has the changing means 80C that changes a force that presses the cylinder block 70 to the port plate 45. In this way, it is possible to transition to the second state where the cylinder block 70 is not pressed to the port plate 45 when the cylinder block pressing mechanism 80B does not have to press the cylinder block 70 to the port plate 45 such as when the cylinder block 70 is pressed to the port plate 45 by the hydraulic pressure in the cylinder chamber 73.

(2) The cylinder block pressing mechanism 80B is disposed outer side in the radial direction of the hydraulic pump 30 with reference to the piston pressing mechanism 80A. More specifically, the distance between the cylinder block pressing mechanism 80B and the rotational axis of the cylinder block 70 is larger than the distance between the piston pressing mechanism 80A and the rotational axis of the cylinder block 70. Moreover, the changing means 80C is provided in the cylinder block pressing mechanism 80B. With this configuration, it is easier to provide the changing means 80C compared to a case where the cylinder block pressing mechanism 80B is disposed at the same position as the piston pressing mechanism 80A. Moreover, the piston pressing mechanism 80A and the cylinder block pressing mechanism 80B press different positions of the cylinder block 70 to the port plate 45 so that it is possible to prevent a large pressing force from being applied to a specific local area of the cylinder block 70 and thereby pressing a specific local area of the port plate 45. In this manner, it is possible to prevent a friction force between the cylinder block 70 and the port plate 45 from being excessively increased when, for example, the cylinder block 70 starts to rotate.

(3) The changing means 80C may change the force that presses the cylinder block 70 to the port plate 45 based on the hydraulic pressure supplied to the cylinder block pressing mechanism 80B. In this way, it is possible to omit a mechanism exclusively used to operate the cylinder block pressing mechanism 80B. Therefore it is possible to simplify the configuration of the changing means 80C.

(4) A hydraulic pressure supplied to the cylinder block pressing mechanism 0B is increased as a hydraulic pressure of the hydraulic pump 30 increases, and a hydraulic pressure in the cylinder chamber 73 increases the force that presses the cylinder block 70 toward the port plate 45. When the hydraulic pressure in the cylinder chamber 73 is sufficiently high, the cylinder block 70 is pressed to the port plate 45 by the hydraulic pressure of the cylinder chamber 73 and thereby it is possible to prevent oil leakage between the cylinder block 70 and the port plate 45. Under this condition, if the cylinder block pressing mechanism 80B presses the cylinder block 70 to the port plate 45, the pressing force that presses the cylinder block 70 to the port plate 45 becomes excessively large and this may make the thickness of the oil film between the cylinder block 70 and the port plate 45 smaller than an appropriate thickness. Consequently the cylinder block 70 may rotate relative to the port plate 45 while the cylinder block 70 is in direct contact with the port plate 45. To prevent this, the changing means 80C decrease the force that presses the cylinder block 70 to the port plate 45 as the hydraulic pressure supplied to the cylinder block pressing mechanism 80B increases. In this way, the force that presses the cylinder block 70 to the port plate 45 applied by the cylinder block pressing mechanism 80B can be decreased as the hydraulic pressure supplied to the cylinder block pressing mechanism 80B increases and consequently it is possible to press the cylinder block 70 to the port plate 45 with an appropriate magnitude of the force based on the hydraulic pressure of the hydraulic pump 30. As a result, it is possible to prevent the thickness of the oil film between the cylinder block 70 and the port plate 45 from being decreased from an appropriate thickness due to the cylinder block pressing mechanism 80B. Therefore it is possible to prevent the cylinder block 70 from being in direct contact with the port plate 45 when the cylinder block 70 rotates relative to the port plate 45.

(5) The changing means 80C decrease the force that presses the cylinder block 70 to the port plate 45 to zero when the hydraulic pressure supplied to the cylinder block pressing mechanism 80B reaches to or above a predetermined value. In this configuration, the cylinder block pressing mechanism 80B does not press the cylinder block 70 to the port plate 45 when an appropriate thickness of the oil film between the cylinder block 70 and the port plate 45 can be secured while the cylinder block 70 is pressed to the port plate 45 by the hydraulic pressure in the cylinder chamber 73. Therefore it is possible to further reduce the risk of the cylinder block 70 directly contacting the port plate 45.

(6) The cylinder block pressing mechanisms 80B are arranged at a regular interval along the circumferential direction of the cylinder block 70. In other words, the cylinder block pressing mechanisms 80B are arranged at a regular interval (an equal angle) about the rotational axis of the cylinder block 70. In this configuration, comparing to a case where only single cylinder block pressing mechanism 80B is provided, it is possible to evenly distribute in the circumferential direction the force that presses the cylinder block 70 to the port plate 45 applied by the cylinder block pressing mechanisms 80B. Consequently it is possible to prevent the cylinder block 70 from tilting with respect to the port plate 45.

(7) The changing means 80C includes the communication passage 55 through which a hydraulic pressure is supplied to the plurality of cylinder block pressing mechanisms 80B. In this configuration, the communication passage 55 can supply a hydraulic pressure to the plurality of cylinder block pressing mechanisms 80B. Therefore with only one introducing oil passage 44A it is possible to provide a hydraulic pressure to the plurality of cylinder block pressing mechanisms 80B. Consequently it is possible to simplify the configuration of the housing 40.

(8) The hydraulic pump 30 includes the fourth bearing 35 that rotatably support the cylinder block 70 relative to the housing 40. The pressing rod 91 in the cylinder block pressing mechanism 80B biases the outer ring 35B of the fourth bearing 35. Thereby it is possible to prevent the cylinder block 70 from sliding on the pressing rod 91 when the cylinder block 70 is rotated. Consequently the cylinder block 70 can be smoothly rotated.

(9) The cylinder block pressing mechanism 80B includes the pressing rod 91 that has the pressure receiving portion 91C for receiving a hydraulic pressure, and the coil spring 92 that presses the pressing rod 91 toward the cylinder block 70. In this configuration, the force that presses the cylinder block 70 to the port plate 45 applied by the cylinder block pressing mechanism 80B can be easily calculated based on the area of the pressure receiving portion 91C and the spring force of the coil spring 92. Therefore it is possible to easily set the pressing force applied by the cylinder block pressing mechanism 80B to press the cylinder block 70 to the port plate 45.

(10) The piston pressing mechanism 80A may be disposed closer to the shaft 31 relative to the nine pistons 61. In this configuration, a dead space between the nine pistons 61 and the shaft 31 can be utilized so that it is possible to reduce the size of the hydraulic pump 30.

(11) The piston pressing mechanism 80A specifies the force that presses the nine pistons 61 to the swash plate 62 based on the spring force of the coil spring 83. The piston pressing mechanism 80A presses the nine pistons 61 to the swash plate 62 with a predetermined force based on the spring force of the coil spring 83. Therefore the piston pressing mechanism 80A does not include the changing means 80C. In this way, it is possible to simplify the structure of the piston pressing mechanism 80A.

(12) The housing 40 and the first block 50 are separately formed. In this way, it makes it easier to form the communication passage 55 between the housing 40 and the first block 50.

(13) When the size of the fourth bearing 35 is small, the width of the outer ring 35B in the radial direction is also made small. Therefore in the case where the pressing rod 91 presses the outer ring 35B, the pressing rod 91 cannot reliably press the outer ring 35B. To address this issue, the cover member 35 that includes the cylindrical portion 37A covering the outer periphery of the outer ring 35B and the flange 37B covering an end surface of the outer ring 35B situated closer to the first block 50 is attached to the outer ring 35B of the fourth bearing 35. Accordingly the pressing rod 91 presses the flange 37B so that it is possible to adequately transmit the pressing force generated by the cylinder block pressing mechanism 80B to the cylinder block 70 to press the cylinder block 70 to the port plate 45.

MODIFICATION EXAMPLES

The above-described embodiment is a merely example of the fluid pressure pump and the fluid pressure system according to the aspects of the invention and the description of the embodiment does not intend to limit the invention to the embodiment. The fluid pressure pump and the fluid pressure system according to the aspects of the invention may include various modifications which will be described below and combinations of two or more modifications which are not contradict to each other in addition to the above-described embodiment.

Modification Example 1

In the above embodiment, the hydraulic pump 30 may omit the communication passage 55, instead, may include introducing oil passages that connect each of the cylinder block pressing mechanisms 80B to the oil passages 16B, 17B.

Modification Example 2

In the above embodiment, the introducing oil passage 44A may be coupled to other oil supply passage other than the first oil passage 16B and the second oil passage 17B. The hydraulic pump 30 may include a hydraulic fluid supply and exhaust device to supply and exhaust oil to the cylinder block pressing mechanisms 80B. The hydraulic fluid supply and exhaust device may include a reservoir that stores oil, oil supply and exhaust passages that connect the reservoir and the hydraulic pump, and a pump that supplies the oil from the reservoir to the hydraulic pump. The pump may be controlled by the control device 21B.

Modification Example 3

In the above embodiment, the pressing rod 91 of the cylinder block pressing mechanism 80B may be electrically operated. For instance, the cylinder block pressing mechanism 80B may be a solenoid that includes a coil formed of electric wires wrapped around a core and a pressing rod that is inserted into the coil. In this case, the coil spring 92 may be omitted.

Modification Example 4

In the above embodiment, the cover member 37 attached to the outer ring 35B of the fourth bearing 35 may have a plate shape of the flange 37B and the cylindrical portion 37A may not be provided.

Modification Example 5

In the above embodiment, the cover member 37 attached to the outer ring 35B of the fourth bearing 35 may not be provided. In this case, the pressing rod 91 of the cylinder block pressing mechanism 80B directly presses the outer ring 35B.

Modification Example 6

In the above embodiment, the fourth bearing 35 may be omitted. In this case, the pressing rod 91 of the cylinder block pressing mechanism 80B directly press the cylinder block 70.

Modification Example 7

In the above embodiment, the third bearing 34 may be omitted. In this case, the swash plate 62 is fixed to the first block 50. Accordingly the pistons 61 slide on the flange 62B of the swash plate 62.

Modification Example 8

In the above embodiment, the cylindrical portion 41 and the side wall 42 of the housing 40 may be separately formed. In the housing 40 and the port plate 45, the cylindrical portion 41 and the port plate 45 may be integrally formed by casting, and cylindrical portion 41 and the side wall 42 may be separately formed.

Modification Example 9

In the above embodiment, the cylinder block pressing mechanisms 80B may be freely arranged, for example, at unequal intervals in the circumferential direction of the cylinder block 70 in consideration of the friction force and the balance of other forces.

Modification Example 10

In the above embodiment, the changing means 80C may include a relief valve that shuts off the introducing oil passage 44A when the hydraulic pressure in the introducing oil passage 44A is blow a predetermined pressure value and opens the introducing oil passage 44A when the hydraulic pressure is equal to or above the predetermined pressure value. The relief valve may be disposed in the introducing portion 44. In this case, the changing means 80C does not supply a hydraulic pressure to the cylinder block pressing mechanisms 80B when the hydraulic pressure in the introducing oil passage 44A is blow a predetermined hydraulic pressure value. Consequently the cylinder block pressing mechanism 80B presses the cylinder block 70 to the port plate 45 with a predetermined force based on a spring force of the coil spring 92. More specifically, the changing means 80C presses the cylinder block 70 to the port plate 45 with a predetermined force when the hydraulic pressure supplied to the cylinder block pressing mechanism 80B is blow the predetermined value. The changing means 80C supplies a hydraulic pressure to the cylinder block pressing mechanism 80B when the hydraulic pressure in the introducing oil passage 44A is equal to or above the predetermined hydraulic pressure value. Consequently the cylinder block pressing mechanism 80B is shifted to the second state and the force applied by the cylinder block pressing mechanism 80B to press the cylinder block 87 to the port plate 45 becomes zero (0). In other words, the changing means 80C does not cause the cylinder block pressing mechanism 80B to press the cylinder block 70 to the port plate 45 when the hydraulic pressure supplied to the cylinder block pressing mechanism 80B reaches to or above the predetermined value.

Modification Example 11

In the above embodiment, the changing means 80C may set the magnitude of the pressing force that is applied by the cylinder block pressing mechanism 80B and that presses the cylinder block 70 to the port plate 45 to a value larger than zero and smaller than a value at the time when the hydraulic pump 30 is stopped or in a start action. In this way, it is possible to press the cylinder block 70 to the port plate 45 with an appropriate pressing force, and consequently it is possible to prevent oil leakage and ablation of the cylinder block 70 and the port plate 45.

Modification Example 12

In the above embodiment, the pressing mechanism 80 may be configured as a single pressing mechanism that includes the functions of the piston pressing mechanism 80A and the cylinder block pressing mechanism 80B. In this case, the pressing mechanism 80 may be disposed at the position where the piston pressing mechanism 80A is supposed to be provided and includes the structure of the piston pressing mechanism 80A and does not include the structure of the cylinder block pressing mechanism 80B. The coil spring 83 of the pressing mechanism 80 may take any one of the following configurations (A) to (C).

(A) A weight may be attached to the end of the coil spring 83 situated closer to the port plate 45 (hereunder referred to as a "plate-side end"). In this case, the coil spring 83 is rotated together with the cylinder block 70 when the hydraulic pump 30 is driven and the plate-side end of the coil spring is pressed to the inner peripheral surface of the central concave portion 78 of the cylinder block 70 due to a centrifugal force acting on the plate-side end. In this manner, a force that supports the plate-side end by the central concave portion 78 of the cylinder block 70 is generated and therefore the force applied by the coil spring 83 to press the cylinder block 70 is decreased.

(B) The wire of the plate-side end of the coil spring 83 situated may have a hollowed structure. The internal space of the plate-side end is filled with a liquid such as oil. In this configuration, the coil spring 83 is rotated when the hydraulic pump 30 is driven and the plate-side end of the coil spring is pressed to the inner peripheral surface of the central concave portion 78 due to a centrifugal force acting on the plate-side end. Therefore the force applied by the coil spring 83 to press the cylinder block 70 is decreased.

(C) The coil spring 83 may be made of a shape-memory alloy. The spring constant of such a coil spring 83 is decreased as the temperature increases. When the hydraulic pump 30 rotates, the temperature in hydraulic pump 30 increases compared to the temperature at the time when the hydraulic pump 30 is stopped. Accordingly the spring constant of the coil spring 83 decreases when the hydraulic pump 30 rotates. Therefore the force applied by the pressing mechanism 80 to press the cylinder block 70 to the port plate 45 when the hydraulic pump 30 rotates is smaller than the force applied by the pressing mechanism 80 and that presses the cylinder block 70 to the port plate 45 when the hydraulic pump 30 is stopped.

Modification Example 13

In the above embodiment, the hydraulic pump 30 may be driven by any input other than the electric motor 22, for example, may be driven by an engine.

It should be apparent to those skilled in the art that the present invention may be embodied in many other specific forms without departing from the scope of the invention. For example, some of the components may be omitted from the components described in the embodiments (or one or more aspects thereof). Further, components in different embodiments may be appropriately combined. The scope of the present invention and equivalence of the present invention are to be understood with reference to the appended claims.

What is claimed is:

1. A fluid pressure pump, comprising:

a port plate in which a fluid passage is formed;

a cylinder block including a cylinder chamber in which a piston is housed, wherein the cylinder chamber is in communication with the fluid passage in the port plate; and a pressing means configured to apply a pressing force to the cylinder block, the pressing force configured to press the cylinder block to the port plate, and a swash plate specifying movement of the piston in a rotational axis direction of the cylinder block, wherein the pressing means comprises:

a changing means configured to change the pressing force, and a piston pressing means configured to press the piston to the swash plate and a cylinder block pressing means that presses the cylinder block to the port plate, wherein the cylinder block pressing means is disposed at a distance from the rotational axis, the distance being larger than a distance between the piston pressing means and the rotational axis, wherein the changing means is provided in the cylinder block pressing means, wherein the cylinder block pressing means is operated by a fluid pressure, and wherein the changing means is configured to decrease the pressing force that presses the cylinder block to the port plate as the fluid pressure supplied to the cylinder block pressing means increases.

2. The fluid pressure pump of claim 1, wherein the changing means is configured to cause the cylinder block pressing means to stop pressing the cylinder block to the port plate when the fluid pressure supplied to the cylinder block pressing means is equal to or above a predetermined fluid pressure value.

3. The fluid pressure pump of claim 1, wherein the changing means is configured to press the cylinder block to the port plate with a predetermined force when the fluid pressure supplied to the cylinder block pressing means is below a predetermined fluid pressure value, and the changing means is configured not to press the cylinder block to the port plate when the fluid pressure supplied to the cylinder block pressing means is equal to or above the predetermined fluid pressure value.

4. The fluid pressure pump of claim 1, wherein the changing means includes a plurality of the cylinder block pressing means, and wherein the plurality of cylinder block pressing means are arranged at a regular interval about the rotational axis.

5. The fluid pressure pump of claim 4, further comprising:

a housing configured to house the plurality of cylinder block pressing means, wherein the changing means includes a communication passage through which a fluid pressure is supplied to the plurality of cylinder block pressing means, and wherein the communication passage is provided in the housing.

6. The fluid pressure pump of claim 1, further comprising a rolling element bearing is attached to an outer periphery of the cylinder block, wherein the cylinder block pressing means is configured to press an outer ring of the rolling-element bearing, and wherein the outer ring is movable in the rotational axis direction by the cylinder block pressing means.

7. The fluid pressure pump of claim 1, further comprising:

a housing configured to house the cylinder block pressing means, wherein the housing includes a holder portion that has an internal space in which the cylinder block pressing means is disposed, and a fluid pressure supplying portion that is communicated with the internal space and configured to supply a fluid pressure to the internal space, wherein the cylinder block pressing means includes:

a pressing rod configured to press the cylinder block to the port plate; and a pressing member configured to apply a pressing force to the pressing rod to press the pressing rod toward the cylinder block in the rotational axis direction, wherein the pressing rod includes a pressure receiving portion that receives the fluid pressure in the direction where the pressing rod moves away from the cylinder block against the force applied to the pressing rod by the pressing member in the rotational axis direction.

8. The fluid pressure pump of claim 1, wherein the piston pressing means is disposed closer to the rotational axis relative to the position where the piston is disposed.

9. The fluid pressure pump of claim 1, wherein the port plate is coaxial with the cylinder block, wherein the pressing means includes a pressing surface that is axially displaceable and is shaped to bias the cylinder block to the port plate in an axial direction, and wherein the changing means includes an opening through which a hydraulic fluid is supplied to dynamically change the pressing force of the pressing surface.

10. A fluid pressure system, comprising:

the fluid pressure pump of claim 1;

a motor driving the fluid pressure pump;

a control device controlling the motor; and a fluid actuator driven by a fluid pressure generated by the fluid pressure pump.

11. A fluid pressure pump, comprising:

a cylinder block including a central axis and a cylinder chamber in which a piston is housed;

a port plate coaxially coupled to the cylinder block, the port plate including a fluid passage communicated with cylinder chamber;

a first biasing member configured to bias the cylinder block to the port plate in a first axial direction;

a biasing force adjuster configured to dynamically control biasing force of the first biasing member; and a second biasing member configured to bias the piston in a second axial direction opposite to the first axial direction, wherein the biasing force adjuster includes an introducing oil passage configured to supply a hydraulic fluid to displace the first biasing member in a second axial direction opposite to the first axial direction to dynamically control the biasing force of the first biasing member.

* * * * *